United States Patent [19]
Lee

[11] Patent Number: 5,990,922
[45] Date of Patent: Nov. 23, 1999

[54] IMAGE SIGNAL PROCESSOR FOR A PRINTER

[75] Inventor: Boem-ro Lee, Seoul, Rep. of Korea

[73] Assignee: Samsung Electronics Co., Ltd., Kyungki-do, Rep. of Korea

[21] Appl. No.: 09/095,498

[22] Filed: Jun. 11, 1998

[30] Foreign Application Priority Data

Aug. 27, 1997 [KR] Rep. of Korea ................. 97-41624

[51] Int. Cl.$^6$ ................................................. H04N 1/40
[52] U.S. Cl. ...................... 347/251; 347/240; 347/247; 347/237; 358/443; 358/444; 358/448; 358/455
[58] Field of Search ................................. 347/232, 237, 347/247, 251, 240; 359/443, 444, 448, 455; 395/112

[56] References Cited

U.S. PATENT DOCUMENTS 5,586,227 12/1996 Kawana et al. ..................... 395/112
5,809,216 9/1998 Ng ..................................... 347/232

*Primary Examiner*—N. Le
*Assistant Examiner*—Hai C. Pham
*Attorney, Agent, or Firm*—Sughrue, Mion, Zinn, Macpeak & Seas, PLLC

[57] ABSTRACT

An image signal processor of a printer is provided. The image signal processor of the printer includes a first memory, a second memory, a multiplexer for selectively and alternately outputting image data to the first memory and the second memory according to a memory select signal, a printer controller for outputting the memory select signal and the image data representing gray scales in a pixel by a predetermined number of gray scale representation bits to the multiplexer, a memory controller controlled by the printer controller for controlling the data output of the first memory and the second memory so that as much image data as the number of gray scale representation bits is alternately output from the first memory and the second memory, a data converter controlled by the printer controller for converting an amount of image data equal to the number of the gray scale representation bits into drive data represented by a set number of bits and outputting the image data, a data repeater for repeating the transfer of the image data alternately output from the first memory and the second memory to the data converter according to the memory select signal, and a drive signal generator for receiving the drive data and driving an optical scanning unit. According to the image signal processor, the time required for transferring data is reduced for image data of lower resolution displayed by gray scales of binary data of less than eight bits such as four bits or two bits than in image data of higher resolution displayed by gray scales of binary data of eight bits in a pixel due to a smaller amount of information to be transferred.

11 Claims, 3 Drawing Sheets

IMAGE SIGNAL PROCESSOR FOR A PRINTER

BACKGROUND OF THE INVENTION

1. Field of the Invention

The present invention relates to an image signal processor for a printer, and more particularly, to an image signal processor for a printer which converts image data represented by gray scales of an arbitrary number of bits per pixel to a drive signal for an optical scanning unit.

The present application is based upon Korean Application No. 97-41624, which is incorporated herein by reference.

2. Description of the Related Art

Referring to FIG. 1, a conventional color printer includes a reset unit 15, optical scanning units 16, developers 17, a dryer 18, and a transferring unit 20 which are spaced apart from each other by predetermined distances and are adjacent to the circulation path of a photosensitive belt 14 circulated around three rollers 11, 12, and 13. A printer controller 25 reads print data input from the outside through a communications cable and converts the print data into a bit signal suitable for engine control. An engine controller 26 outputs a drive signal corresponding to the bit signal to the optical scanning units 16.

The printer controller 25 reads the print data and outputs the print data as data consisting of a binary bit which, in turn, is sensed by the engine controller 26. The engine controller 26 generates a drive signal corresponding to the data value of the binary bit and outputs the drive signal onto the optical scanning units 16. The optical scanning units 16 scan light corresponding to the drive signal on the photosensitive belt 14 which circulates past the reset unit 15. An electrostatic latent image is then formed on the photosensitive belt 14 by the scanned light. The electrostatic latent image is developed by a developing solution supplied from the developers 17. A color image is formed on the photosensitive belt 14 by the optical scanning units 16 which scan light having different color information and the developers 17 which develop the color information with developing materials corresponding thereto. The color image formed on the photosensitive belt 14 is then passed by the dryer 18 before being transferred onto a transferring roller 21 in which a portion thereof rotates in contact with the photosensitive belt 14 through the continuous movement of the photosensitive belt 14. The image on the transferring roller 21 is then transferred to a print medium 23 by the rotation of the transferring roller 21 and a pressing roller 22 which advances the print medium 23 by rotating in contact with the inserted print medium 23 therebetween.

The engine controller 26 includes a plurality of memory devices for temporarily storing received data (not shown in the drawing) and a drive signal generator for generating the drive signal to the optical scanning units 16. The drive signal generator is designed to receive data in eight-bit units for a pixel so as to generate a drive signal corresponding to gray scale information of 256 shades in a pixel.

However, in a conventional image signal processor for a printer, the printer controller 25 converts print data having less than 256 gray scales in a pixel (e.g., 16 gray scales in a pixel) into data represented by eight bits for a pixel and outputs the data to the engine controller 26. As a result, the conventional image signal processor takes longer to transfer data since data rows are unnecessarily increased with respect to print data represented by gray scales of less than eight bits.

SUMMARY OF THE INVENTION

To solve the above problem, it is an objective of the present invention to provide an image signal processor of a printer with which time spent on transferring data is reduced by suppressing the unnecessary increase of data rows.

Accordingly, to achieve the above objective, there is provided an image signal processor for a printer according to one embodiment of the present invention, comprising a first memory, a second memory, a multiplexer for selectively and alternately outputting image data to the first memory and the second memory according to a memory select signal, a printer controller for outputting the memory select signal and the image data representing gray scales in a pixel by a predetermined number of gray scale representation bits to the multiplexer, a memory controller controlled by the printer controller for controlling the data output of the first memory and the second memory so that the amount of image data is equal to the number of gray scale representation bits alternately output from the first memory and the second memory, a data converter controlled by the printer controller for converting the amount of image data equal to the number of the gray scale representation bits into drive data represented by a set number of bits and outputting the drive data, a data repeater for repeating the transfer of the image data alternately output from the first memory and the second memory to the data converter according to the memory select signal, and a drive signal generator for receiving the drive data and driving an optical scanning unit.

To achieve the above objective, there is also provided an image signal processor for a printer according to another embodiment of the present invention, comprising a first memory in which image data is stored, a second memory downloading the image data from the first memory, a printer controller for outputting the image data representing gray scales in a pixel by a predetermined number of gray scale representation bits to the first memory, a memory controller controlled by the printer controller for controlling the output of the image data of the second memory, a data converter controlled by the printer controller for converting the image data into drive data and outputting the data, and a drive signal generator for receiving the drive data and driving an optical scanning unit.

BRIEF DESCRIPTION OF THE DRAWINGS

The above objective and advantages of the present invention will become more apparent by describing in detail a preferred embodiment thereof with reference to the attached drawings in which.

DESCRIPTION OF THE PREFERRED EMBODIMENTS

Figure 1:
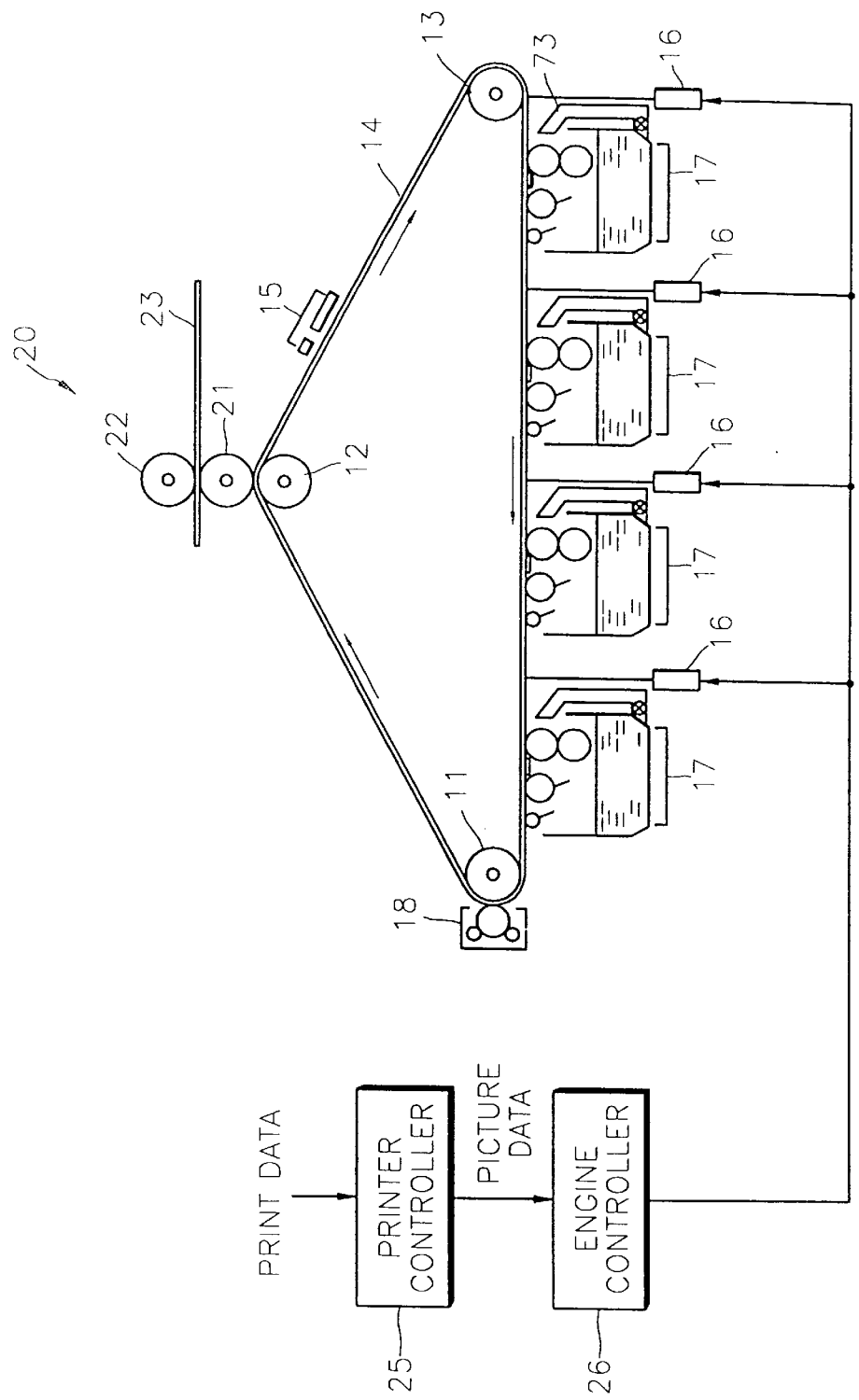
FIG. 1 shows a conventional printer.
Figure 2:
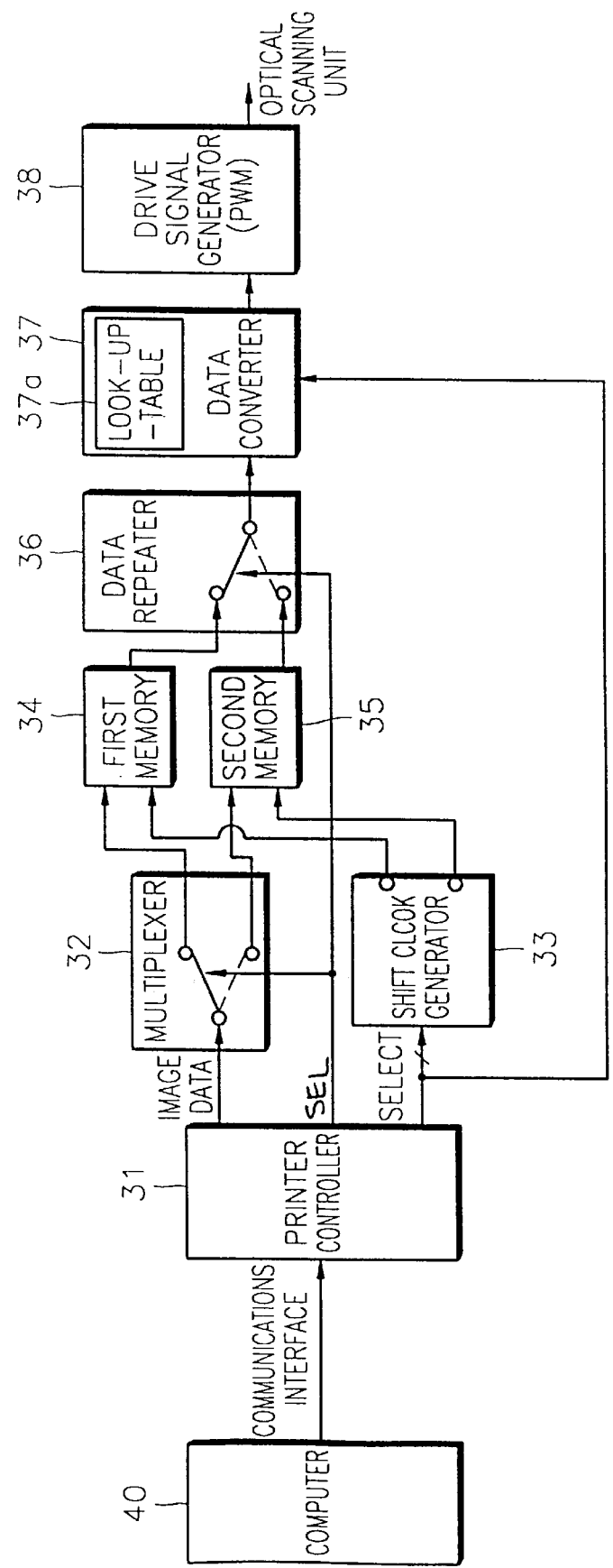
FIG. 2 is a block diagram showing an image signal processor of a printer according to an embodiment of the present invention.

Referring to FIG. 2, in an image signal processor for a printer according to an embodiment of the present invention, a printer controller 31 is connected to a personal computer 40 through a communications interface. The printer controller 31 converts print data received through the communications interface into image data of a binary bit pattern and outputs the image data to a multiplexer 32. In addition, the print controller 31 also supplies a memory select signal (SEL) to the multiplexer 32 which allows the image data to be selectively and alternately distributed by the multiplexer 32. If the print data input to the printer controller 31 is already in the form of a binary bit pattern which does not need to be converted, it is simply output "as is" to the multiplexer 32 by the printer controller 31. In this manner, the number of gray scale representation unit bits of image data output to the multiplexer 32 can be either selected before the data is input to the printer controller 31 or during the process in which the printer controller 31 converts the print data into image data.

Here, the number of the gray scale representation unit bits corresponds to the amount of information required for representing gray scales with respect to a unit pixel. In the case of a binary signal, the number of unit bits required for representing the 256 gray scales in a pixel is eight and the number of unit bits required for representing the gray scale fractionated into 16 gray scales in a pixel is four.

The multiplexer 32 divides the image data continuously output from the printer controller 31 into a predetermined number of bits and alternately outputs the data to a first memory 34 and a second memory 35 according to the memory select signal (SEL). Considering the data transfer speed, the respective data transfer lines between the printer controller 31 and the multiplexer 32, and between the multiplexer 32 and each memory 34 or 35 preferably include eight parallel lines by which the eight bits of information can be transferred at once. The first memory 34 and the second memory 35 then alternately output the image data through either parallel or series lines to a data repeater 36. A shift clock generator 33 generates a clock signal which is used to synchronized the alternate output of the first and second memories 34 and 35. The data repeater 36 receives the image data alternately output from the first memory 34 and the second memory 35 and repeats the image data to a data converter 37 according to the memory select signal (SEL).

The data converter 37 converts the image data received from the data repeater 36 into drive data represented by a set number of bits such as eight bits, for example, corresponding to the information on the number of the gray scale representing unit bits of the image data to be currently processed which are supplied from the printer controller 31 and outputs the drive data to a drive signal generator 38.

Preferably, a look-up table 37a is built into the data converter 37 wherein drive data values are stored corresponding to the received image data to be converted to drive data values according to the number of the gray scale representing bits.

A drive signal generator 38 outputs a modulated signal which is the drive signal for the optical scanning unit having a pulse width corresponding to the drive data. Accordingly, the optical scanning unit emits light whose exposure is as long as the pulse width of the modulated signal.

Hereinafter, the operation of the drive signal generator 38 will be described with respect to a case in which the data converter 37 generates the drive data represented by eight bits regardless of the number of the gray scale representing unit bits of the input image data.

First, the printer controller 31 outputs image data having a predetermined number of gray scale representing bits to the multiplexer 32. For example, when the number of the gray scale displaying bits is four (i.e., the bits can be represented as 16 gray scales) a shift clock generator 33 outputs a clock signal to allow data comprised of four bits to be alternately output from the respective first memory 34 and second memory 35 according to a control signal (SELECT) provided by the printer controller 31. The image data alternately stored in the respective memories 34 and 35 through the multiplexer 32 is supplied to the data converter 37 from the data repeater 36 by four bits according to the clock signal. The data converter 37 reads the value of the data input from the data repeater 36 in four bit units, is informed by the control signal (SELECT) input from the printer controller 31 that the number of the gray scale representing bits of a pixel unit is four, searches the eight bit drive data in the look-up-table 37a corresponding to the data input value, and outputs the corresponding drive data to the drive signal generator 38. The drive signal generator 38 generates a modulated signal for driving the optical scanning unit from the drive data represented by eight bits.

When the printer controller 31 outputs image data having the number of the gray scale representing bits of eight bits in a pixel, the multiplexer 32 alternately outputs the image data input in parallel by eight bits to the first memory 34 and to the second memory 35. The first and second memories 34 and 35 then alternately output 8-bit data to the data converter 37 through the data repeater 36, synchronized with the clock signal provided by the shift clock generator 33. The data converter 37 outputs the image data of eight bits received by the information supplied by the printer controller 31 to the drive signal generator 38 without a data converting process. This is because the drive signal generator 38 is designed to receive the drive data signal of the eight bit pattern and can directly use the image data as the drive data.

As a result, since the image data is transferred from the printer controller 31 to the data converter 37 with only the information of a minimum unit required for gray scale representation of an image to be printed, the time required for transferring data is reduced for image data having a smaller number of gray scale representation bits in a pixel. Namely, in image data of low quality having a smaller number of gray scale representation bits than that of image data of high quality requiring a large number of gray scale representation bits in a pixel, the time required for transferring data is reduced since overall image information is reduced.

Figure 3:
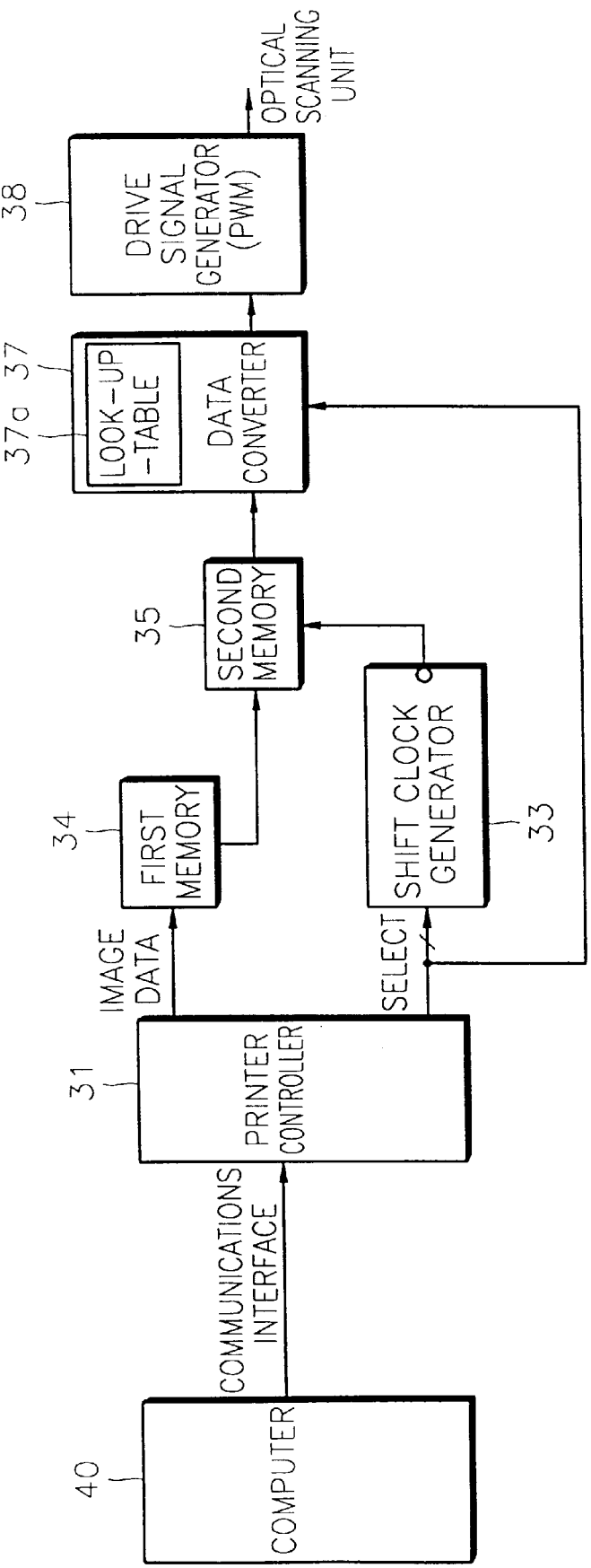
FIG. 3 is a block diagram showing an image signal processor of a printer according to another embodiment of the present invention.

Another example of repeating the transfer of the image data from the printer controller 31 to the data converter 37 is shown in FIG. 3. The same reference numerals as those of FIG. 2 perform the same functions.

Referring to FIG. 3, the image data output from the printer controller 31 is stored in the first memory 34. The second memory 35 then downloads the image data from the first memory 34. The second memory 35 outputs the image data from the data converter 37 in a unit of the number of gray scale representation bits and is synchronized with the clock signal of the shift clock generator 33 which is used as a memory controller.

As mentioned above, according to the image processor of the printer according to the present invention, less time is required to transfer image data having a smaller number of bits assigned to gray scale representation in a pixel.

While the present invention has been described and illustrated with reference to the preferred embodiments thereof, it is to be readily understood that the present invention is not limited to these embodiments, and various changes and modifications can be made therein without departing from the spirit and scope of the invention defined in the appended claims.

What is claimed is:

1. An image signal processor for a printer, comprising:

a first memory;

a second memory;

a printer controller for outputting a memory select signal, a control signal and image data representing gray scales in a pixel by a predetermined number of gray scale representation bits;

a multiplexer receiving the memory select signal and the image data and selectively and alternately outputting said image data to the first memory and the second memory according to the memory select signal;

a memory controller controlled by the printer controller according to the control signal for controlling the image data output from the first memory and the second memory so that an amount of image data equal to the predetermined number of gray scale representation bits is alternately output from the first memory and second memory;

a data repeater for repeating the transfer of a image data alternately output from the first memory and the second memory according to the memory select signal;

a data converter receiving the image data alternately output from the first memory and the second memory and being controlled by the printer controller according to the control signal for converting the amount of image data equal to the number of the gray scale representation bits alternately output from the first and second memories into drive data represented by a set number of bits; and a drive signal generator receiving the drive data output from the data converter and driving an optical scanning unit according to the drive data.

2. The image signal processor of claim 1, wherein the memory controller is a shift clock generator for generating a clock signal and instructing the first memory and the second memory to output data.

3. The image signal processor of claim 1, wherein the data converter comprises a look-up table in which drive data corresponding to the number of gray scale representation bits in a pixel of the input image data is stored.

4. An image signal processor for a printer, comprising:

a first memory for storing image data representing gray scales in a pixel by a predetermined number of gray scale representation bits;

a second memory downloading and storing the image data from the first memory;

a printer controller for outputting the image data to the first memory;

a memory controller controlled by the printer controller for controlling the output of the image data stored in the second memory;

a data converter receiving the output of the second memory and being controlled by the printer controller for converting the image data by an amount equal to the number of the gray scale representation bits into drive data represented by a predetermined number of bits; and a drive signal generator for receiving the drive data from the data converter and driving an optical scanning unit according to the received drive data.

5. The image signal processor of claim 4, wherein the memory controller is a shift clock generator for generating a clock signal and instructing the second memory to output data.

6. The image signal processor of claim 4, wherein the data converter comprises a look-up table in which drive data corresponding to the number of gray scale representation bits in a pixel of the image data is stored.

7. An image signal processor for a printer comprising:

a first memory;

a second memory;

a printer controller for outputting image data representing gray scales in a pixel by a predetermined number of gray scale representation bits to at least said first memory;

a memory controller controlled by said printer controller for controlling an output of image data from at least one of said memories;

a data converter controlled by the printer controller for converting said output of image data from at least one of said memories according to the predetermined number of gray scale representation bits into drive data represented by a predetermined number of bits; and a drive signal generator for receiving said drive data and driving an optical scanning unit based on said drive data.

8. The image signal processor of claim 7 further comprising:

a multiplexer for selectively and alternately transferring said image data from said printer controller to said first and second memories according to a memory select signal provided by said printer controller;

said memory controller generating a clock signal instructing said first and second memories to alternately output said image data selectively and alternately input to said memories; and a data repeater for repeating the transfer of said image data alternately output from said first and second memories to said data converter according to said memory select signal.

9. The image signal processor of claim 7 wherein, said second memory downloads image data from said first memory and outputs said downloaded image data to said data converter, and said memory controller generates a clock signal for instructing said second memory to output said downloaded image data.

10. The image signal processor of claim 7, wherein the memory controller is a shift clock generator for generating a clock signal.

11. The image signal processor of claim 7, wherein the data converter includes a look-up table in which drive data corresponding to the number of gray scale representation bits in a pixel of image data is stored.

* * * * *